United States Patent [19]

Maroth et al.

[11] 4,270,753
[45] Jun. 2, 1981

[54] GOLF CLUB SWING INDICATOR

[76] Inventors: Arthur M. Maroth; Sybil Maroth, both of 1101 SW. 13th Pl., Boca Raton, Fla. 33432

[21] Appl. No.: 96,326

[22] Filed: Nov. 21, 1979

[51] Int. Cl.³ .............................................. A63B 69/36
[52] U.S. Cl. .............................. 273/186 A; 273/194 R
[58] Field of Search ............... 273/186 A, 26 B, 29 A, 273/194 R, 186 R; 73/379

[56] References Cited

U.S. PATENT DOCUMENTS

| 2,780,098 | 2/1957 | Maroth | 273/26 B |
| 2,986,937 | 6/1961 | Chapman | 273/186 A |
| 3,758,117 | 9/1973 | Harrison | 273/186 A X |

Primary Examiner—George J. Marlo
Attorney, Agent, or Firm—H. Gibner Lehmann; K. Gibner Lehmann

[57] ABSTRACT

A golf club swing-force indicator comprising an elongate housing adapted to be attached to the shaft of a golf club. A weight is movable on the housing between retracted and extended positions against spring action, becoming extended due to centrifugal force when the club is swung, and being held in any extended position by a releasable catch. Normally the weight is held retracted by a yieldable biasing means which acts counter to the centrifugal force. An indicator shows the degree of extension of the weight, and gives a reading that is proportional to the force of the swing.

8 Claims, 9 Drawing Figures

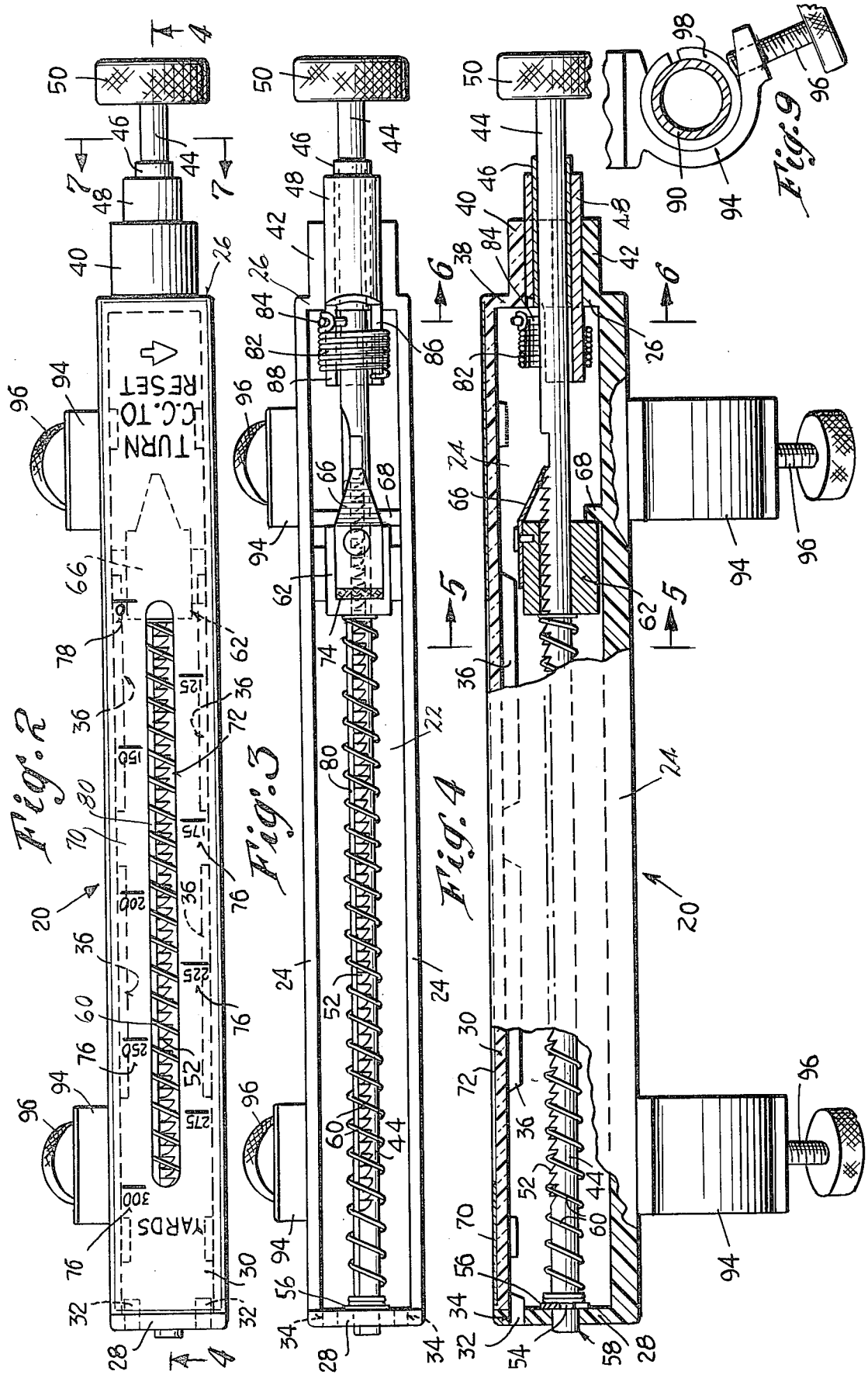

GOLF CLUB SWING INDICATOR

BACKGROUND

This invention relates to force-indicator devices for showing the power of swing of a golf club, and more particularly to devices of this type which are in the nature of an accessory or add-on.

In the past various types of equipment have been proposed and produced, to enable a golfer to improve his power or drive swing. Complicated guide rails of various kinds were patented and used, especially with beginners or newcomers to the game. Motion pictures of a swing were analyzed, to reveal faulty stances and accurate travels of the club. Instructors would study a golfer's swing to ascertain faults or opportunities for possible improvement. Speed checks were made, to show the club speed at various points in the path of movement. Heretofore, however, the numerous pieces of equipment were relatively large and heavy, expensive, and usually beyond the reach or pocketbook of the average golfer.

SUMMARY

Some of the above disadvantages and drawbacks of prior instruction or assist devices for golfers are obviated by the present invention, which has for one object the provision of a novel and improved golf club swing indicator adapted to show the power of a swing, which is especially small, compact and inexpensive.

Another object of the invention is to provide an improved golf club swing indicator as above set forth, which can be easily and quickly attached to the shaft of an existing golf club without requiring alteration of the latter or the use of tools.

Yet another object of the invention is to provide an improved golf club swing indicator in accordance with the foregoing, which is effective and reliable in its operation, and which has a reasonably high degree of accuracy.

Still another object of the invention is to provide an improved swing indicator of the kind described, which is simple to understand and to operate.

Features of the invention reside in the provision of a golf club swing indicator as characterized above, which is especially simple in construction and constituted of few parts which can be inexpensively fabricated and assembled.

In accomplishing the above objects, the invention provides a golf club swing-force indicator which, in the preferred embodiment of the invention, comprises an attachment that can be easily affixed to the shaft of any golf club as by means of brackets in the form of C-clamps which partially encircle the shaft. The brackets are carried by an elongate housing which is preferably of square or rectangular cross section. Longitudinally movable in the housing is a weight member which has a rectangular configuration whereby its engagement with the housing keys it against turning. The weight member is carried by a shaft that extends longitudinally in the housing and which has ratchet teeth that are engaged by a pawl of the member. This provides for uni-directional working movement of the weight member, this being opposed by a helical coil spring on the shaft. The uni-directional movement is the result of centrifugal force on the member at the time that the golf club is swung. Such force advances the member along the shaft to a point where the force is exactly counteracted by the coil spring. The ratchet teeth prevent return of the member, and its positions are read by referring an index mark on the member to an elongate scale which is carried by the housing. The adjusted position of the member is not only indicative of the centrifugal force which is experienced but also can be taken as an indication of the distance that the struck golf ball will normally travel if it has been struck squarely by the club head.

The shaft which carries the weight member has a relieved or grooved portion that can be presented to the pawl when the shaft is partially turned. Such action enables the helical coil spring to snap the weight member back to its starting position, since the ratchet teeth on the shaft become disengaged from the pawl as a result of the shaft turning partially. A second helical coil spring controls the rotative position of the shaft, in conjunction with a stop device on the shaft, which is engageable with a housing part. Such housing part also can constitute the bearing for the shaft, at one end of the housing whereas another bearing is provided at the other housing end, to accommodate the corresponding other end of the shaft. The said one end of the shaft protrudes, and has a thumb wheel which enables the shaft to be readily turned through its partial revolution for the purpose of disengaging the teeth and retrunging the weight member.

All of the parts of the device are of simple, straightforward construction, and may be readily, economically fabricated and assembled whereby the device has a low manufacturing cost.

Still other features and advantages will hereinafter appear.

In the accompanying drawings:

FIG. 2 is a top plan view of the golf club swing indicator device.

FIG. 3 is a view similar to that of FIG. 2 but with the casing cover removed to reveal interior details.

FIG. 4 is a side elevational view of the golf club swing indicator, with portions broken away and illustrated in section to reveal further interior details.

FIG. 9 is a fragmentary detail illustrating in elevation one of the mounting brackets by which the device is attached to the shaft of the golf club.

Figure 1:
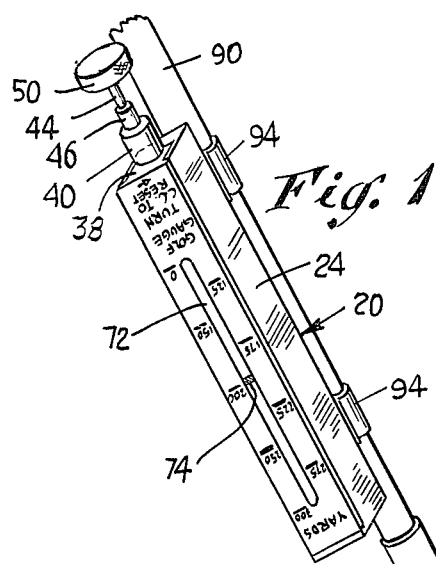
FIG. 1 is a fragmentary perspective view of the lower portion of a golf club, showing the improved golf swing indicator device of the invention secured in operative position.
Figure 5:
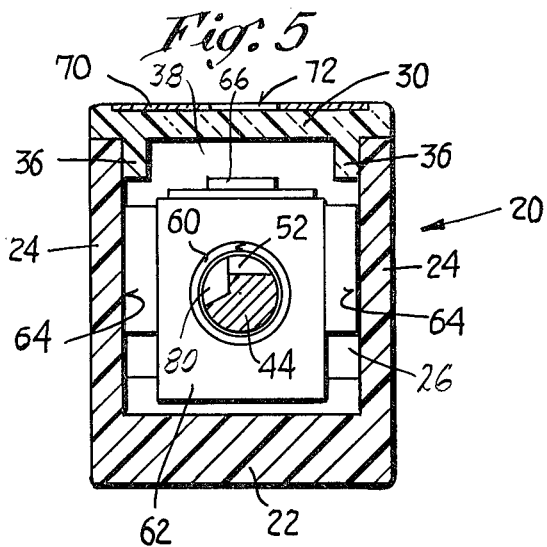
FIG. 5 is a transverse section taken on the line 5—5 of FIG. 4.
Figure 6:
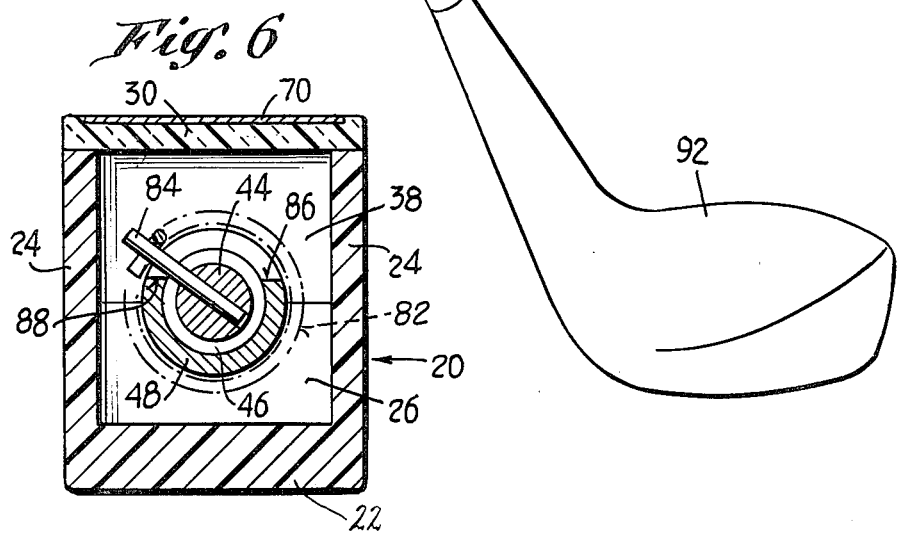
FIG. 6 is a transverse section taken on the line 6—6 of FIG. 4.
Figures 7, 8:
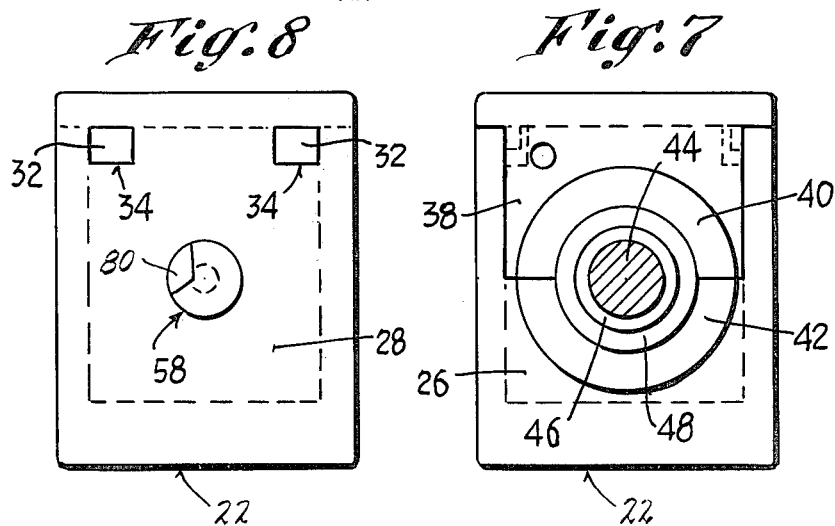
FIG. 7 is a top end elevational view of the indicator device, with the rack shaft shown in cross section.
FIG. 8 is a bottom end elevational view of the device.

As shown, the golf swing indicator device of the invention comprises a casing or housing 20 which is illustrated as having a rectangular cross sectional configuration, with an elongate bottom wall 22 and elongate side walls 24, which together with end walls 26 and 28 form an elongate enclosed space. The housing is provided with an elongate, flat or strip-like cover 30 which has a pair of lugs 32 at one end, received in apertures 34 of the bottom end wall 28 in an interlocking arrangement. The cover piece 30 has positioning ribs or beads 36 which extend along the inner sides of the side walls 24 to position the cover on the housing, and at its other end the cover piece 30 has an apron portion 38 provided with a semi-cylindrical bearing half or part 40 which is cooperable with a companion bearing half or part 42 of the housing so as to turnably carry an elongate, turnable rack shaft 44. At the bearing halves 40, 42 the rack shaft 44 has a press-fitted sleeve 46 which constitutes a bearing which is turnable in a bushing 48 that can be fixed in the bearing half 42.

The rack shaft 44 has a finger wheel or finger piece 50 to enable it to be manually turned an extent, and has a row of rack teeth 52 extending for a substantial distance within the housing 20. At its other end, the rack shaft 44 has an annular groove 54 which receives a C-washer 56. The shaft extends through an opening 58 in the end wall 28, and the C-washer 56 engages the inner surfaces of the end wall to constitute one stop which prevents endwise movement of the shaft 44 from right to left as viewed in FIGS. 2, 3 and 4.

Disposed on the rack shaft 44 is a helical extension spring 60 which at one end engages the C-washer 56 and at its other end engages a weight member 62 that is slidable along the shaft 44 and inside of the housing 20. The weight member 62 is of rectangular cross section preferably, and has side bearing surfaces 64 adapted to engage the inside surfaces of the side walls 24 of the housing, thereby to prevent turning movement of the weight member 62 about the shaft 44. Also, the weight member is provided with a pawl 66 which is resilient and is adapted to engage the rack teeth 52 as the weight member is shifted longitudinally along the shaft 44. Such shifting is effected in response to centrifugal force acting on it, as will be later explained. Normally, for the inoperative position or zero setting of the device, the weight member 62 is engaged with a stop shoulder 68 provided in the housing 20 on the bottom wall 22 thereof, being held in such engagement by the expansion action of the extension spring 60.

On the casing cover 30 there is provided a scale plate 70 having a longitudinally extending viewing window 72; the cover member 30 is transparent whereby the position of the weight member 62 can be ascertained when looking at the device. An index mark 74 carried by the weight member 62 is visible through the window 72 of the scale plate 70, and provides an indication of the position of the weight member along the rack shaft 44.

As seen in FIG. 2, the scale plate 70 can be marked off by numbers 76 indicating yards, and the plate has a zero indication 78 for the starting position of the weight member, in which position the index mark 74 thereof is seen at the bottom or rightmost end of the view window 72.

It can now be understood that with such arrangement, and with the swing indicator device positioned on the golf club as viewed in FIG. 1, the swinging movement of the club will cause the device to be subjected to centrifugal force, and such force can act on the weight member 62 and shift it along the rack shaft 44 against the action of the extension spring 60, which now becomes compressed further. The greater the swing force of the golf club, the greater the centrifugal force to which the weight member 62 is subjected, and the greater the distance that it will travel along the rack shaft 44, thus indicating higher values of yardage on the scale plate 70.

For the purpose of resetting the weight member 62 the rack shaft 44 has a relieved portion or groove 80 which can be presented to the pawl 66 by turning the shaft 44 through approximately ¼ of a revolution. Normally, the shaft is held against such turning by a helical torsion spring 82 one end of which engages a lateral abutment or pin 84 that is set in the shaft 44. The other end of the spring 82 engages a stop or shoulder surface 86 of the bushing 48 which is affixed to the housing 20. The bushing 48 has a second stop or shoulder surface 88 which is engageable by the pin 84 to normally stop the turning movement of the shaft 44 in a position where the rack teeth 52 are engageable by the resilient pawl 66. Turning of the shaft 44 counterclockwise as viewed from the right end of the device in FIGS. 2, 3 and 4 will enable a quarter turn to be effected against the action of the torsion spring 82, bringing the groove 80 in position to provide clearance for the pawl 66 as the latter disengages the rack teeth 52. Thereupon, the force of the extension spring 60 against the weight member 62 will return the latter to its starting position against the stop shoulder 68 as seen in FIGS. 2, 3 and 4. Upon removal of finger pressure from the wheel 50, the torsion spring 82 will again prevail and return the rack shaft 44 to the position shown in the drawings wherein the pawl 62 can engage the rack teeth 52.

The torsion spring 82 has hooked ends, as seen in FIG. 3, to maintain it in its operative position, one end engaging the stop pin 84 and the other engaging the shoulder surface 86.

A convenient and advantageous means for securing the casing 20 to the golf club shaft 90 at a point above the golf head 92 is provided by the invention, in the form of a pair of mounting brackets 94 having thumb screws 96 and sizing bushings or adapters 98. As seen in FIGS. 1, 4 and 9, the mounting brackets 94 which are somewhat resilient can be slipped over the club shaft 90 either with or without the sizing bushings 98 and then the thumb screws 96 can be tightened to secure the device in its desired operative position as shown in FIG. 1.

It will now be seen from the foregoing that I have provided a unique, improved golf club swing indicator which responds to centrifugal force as the golf club is swung, providing the golfer with an indication as to the force of the swing. If the golf ball is hit squarely by the club head 92, the readings on the scale plate 70 will provide a reasonably accurate indication as to the yardage which can be expected from the stroke. The device is seen to involve relatively few parts which are straightforward in their operation, and which can be economically fabricated and assembled. The operation is reliable and the device constitutes a useful accessory to serious golfers who are interested in improving their game, or in checking on the results of different swing techniques.

Variations and modifications are possible without departing from the spirit of the invention.

I claim:

1. A golf club swing-force indicator comprising, in combination:
   (a) an elongate turnable shaft having a lateral abutment spaced inwardly from one of its ends,
   (b) a finger piece rigid with the shaft and carried by said one end,
   (c) said shaft having a bearing area between the rigid finger piece and the abutment,
   (d) a pair of bearings for the shaft,
   (e) one of said bearings engaging and supporting said bearing area of the shaft between said finger piece and lateral abutment, and the other bearing engaging and supporting the other end of the shaft,
(f) a torsion spring encircling the shaft at a location inwardly of said one bearing, one end of said spring engaging the abutment on the shaft and the other end of the spring reacting against said one bearing, thereby to bias the shaft for turning in said one bearing,
(g) a weight member having an indicator, slidable along the shaft,
(h) a compression spring on the shaft, engaging the weight member to bias the latter toward one end of the shaft,
(i) said weight member having a pawl and said shaft having a row of teeth cooperable with the pawl to hold the weight member in various adjusted positions against the action of said compression spring,
(j) said shaft having a smooth track on which the pawl can alternately ride when the shaft is turned against the action of said torsion spring, thereby to enable return of the weight to a starting position under the action of said compression spring, and
(k) a housing carrying said bearings and enclosing the said shaft, weight and springs.

2. The invention as defined in claim 1, and further including:
(a) a stop on said one bearing,
(b) said lateral abutment comprising a pin carried by said turnable shaft,
(c) said pin directly engaging said stop.

3. The invention as defined in claim 2, wherein:
(a) the said one end of the torsion spring is hooked for connection to the pin of the shaft.

4. The invention as defined in claim 2, wherein:
(a) said one bearing comprises a bushing carried by the housing,
(b) said bushing having a cut out portion at one end, defining a pair of opposite shoulder surfaces,
(c) one of said shoulder surfaces constituting said stop.

5. The invention as defined in claim 4, wherein:
(a) the other of said shoulder surfaces of the bushing constitutes a second stop for limiting the turning of the shaft in the direction against the action of the torsion spring.

6. The invention as defined in claim 5, wherein:
(a) said pin directly engages the said second stop when the shaft is turned in the said direction.

7. The invention as defined in claim 6, wherein:
(a) one end of said torsion spring is hooked around said pin,
(b) the other end of said torsion spring being hooked over one of said shoulder surfaces.

8. The invention as defined in claim 1, wherein:
(a) said one bearing comprises a bushing on the shaft,
(b) said housing having cooperable separate parts disposed on opposite sides of said bushing and rigidly mounting the same.

* * * * *